US008078825B2

(12) United States Patent
Oreland et al.

(10) Patent No.: US 8,078,825 B2
(45) Date of Patent: Dec. 13, 2011

(54) COMPOSITE HASH AND LIST PARTITIONING OF DATABASE TABLES

(75) Inventors: Jonas Oreland, Stockholm (SE); Frazer Clement, Camberley (GB); Tomas Ulin, Stockholm (SE)

(73) Assignee: Oracle America, Inc., Redwood City, CA (US)

( * ) Notice: Subject to any disclaimer, the term of this patent is extended or adjusted under 35 U.S.C. 154(b) by 486 days.

(21) Appl. No.: 12/402,024

(22) Filed: Mar. 11, 2009

(65) Prior Publication Data
US 2010/0235606 A1     Sep. 16, 2010

(51) Int. Cl.
*G06F 12/00* (2006.01)
(52) U.S. Cl. ........ 711/173; 711/114; 711/165; 711/216; 711/221
(58) Field of Classification Search .................. None
See application file for complete search history.

(56) References Cited

U.S. PATENT DOCUMENTS

| 6,725,261 | B1 | 4/2004 | Novaes et al. |
| 7,269,646 | B2 | 9/2007 | Yamamoto et al. |
| 2003/0188085 | A1 | 10/2003 | Arakawa et al. |
| 2006/0101224 | A1 | 5/2006 | Shah et al. |
| 2007/0143380 | A1 | 6/2007 | Plow et al. |
| 2008/0046400 | A1* | 2/2008 | Shi et al. ..................... 707/2 |
| 2008/0059746 | A1 | 3/2008 | Fisher |
| 2008/0189239 | A1 | 8/2008 | Bawa et al. |
| 2008/0263001 | A1 | 10/2008 | Lohman et al. |
| 2009/0043863 | A1 | 2/2009 | Lashley et al. |

OTHER PUBLICATIONS

International Search Report for PCT/US2010/026746, dated Sep. 28, 2010, from Korean Intellectual Property Office.

* cited by examiner

*Primary Examiner* — Shawn X Gu
(74) *Attorney, Agent, or Firm* — Marsh Fischmann & Breyfogle LLP; Kent A. Lembke

(57) ABSTRACT

A method for partitioning during an online node add. The method includes providing a data storage cluster with first and second nodes, and storing a table of data in the data storage cluster with a first partition storing a set of rows or data elements in the first node and a second partition storing a set of rows or data elements in the second node. The method includes adding a third node to the cluster and adding a third partition to the table using a partitioning mechanism to create a distribution mapping for data elements in the first, second, and third partitions. The distribution mapping provides substantially uniform distribution of the data elements over the first, second, and third partitions by the partitioning mechanism using modulo hash partitioning as a function of data elements or by combining hash and list partitioning such that data is retained on the original partitions.

17 Claims, 6 Drawing Sheets

COMPOSITE HASH AND LIST PARTITIONING OF DATABASE TABLES

BACKGROUND OF THE INVENTION

1. Field of the Invention

The present invention relates, in general, to methods and systems for managing data storage in tables and databases, and, more particularly, to methods and systems for providing improved partitioning of a table of data to support adding a node to a data storage cluster.

2. Relevant Background

In the data storage or information technology industry, relational database management systems (RDMS) provide important support for a wide variety of commercial applications, and there is growing demand for methods and devices for effectively and efficiently storing large quantities of data in a manner that allows it to be quickly retrieved and reliably stored. In databases, information is typically stored in rows of data fields storing pieces of information (e.g., one field may store a person's name, another field may store the person's address, and so on within a row) with one or more of the fields providing a key (e.g., a primary key may be included that uniquely identifies each row of data in a database or table). For example, clustered, high-availability databases are used by telecommunication companies and many other service providers such as financial institutions, Web-based retailers and service providers, and the like. The rate of increasing size of databases causes many challenges within the data storage industry including how to add additional storage devices (such as disk drives, tape drives, optical drives, servers, and the like) and/or how to provide more nodes for storing larger and larger tables. For example, more storage nodes may be added to handle rapidly increasing volumes of data stored in rows of a table, and such node addition may require modification of a database cluster to handle the additional information.

Every RDMS developer eventually encounters a situation in which a table stores a huge amount of historical data, but users typically only retrieve small, distinct portions at any particular time. For example, a financial institution may track millions of records related to trades of stocks spanning years, but a user may only need to retrieve trade data for a small time period such as a particular month. To improve query performance as well as storing growing volumes of data in a table, a RDMS developer often splits a large table into separate tables with the same structure (e.g., same fields/columns). A table typically is partitioned horizontally with each member or separate table having the same number of columns/fields as the original table, and each column has the same attributes (such as data type, size, and the like) as the corresponding column in the original table. An ongoing challenge for the RDMS developer is how to partition tables of data in a manner that provides a better utilization of hardware and allows for quick reproduction and/or reorganization of data.

For example, effective hardware utilization may involve deciding how to partition tables in relational database management systems implementing shared-nothing architectures to provide database management. With a shared-nothing approach, each processor has its own data storage as well as local disks or data storages. Except for the communication network, no other resources are shared among the processors. For example, the MySQL™ NDB Cluster storage engine is a distributed, shared-nothing storage engine with synchronous replication with a cluster and automatic horizontal data partitioning across the nodes that store the distributed data (e.g., buckets or partitions of a table). With this storage engine, any given row of data of a table is eligible to be stored in any of the partitions on the clustered nodes. The table's definition specifies which rows map to which partitions based on a partitioning function, and, as a result, it is important to choose or design the partitioning function to achieve effective reorganization of a table of data when a node is being added to a cluster. Partitioning is a significant design problem for other storage engine products as inefficient partitioning can quickly result in undesirable distributions of data (e.g., with some nodes storing larger portions of a table) and inefficient use of storage during reorganization processes.

It may be useful to utilize a table reorganization mechanism that would be used by the storage engine for adding partitions to a table that remain online and available. Design requirements for such a table reorganization mechanism may be that online transactions (e.g., reads, scans, and updates) should not be blocked. Additionally, the reorganization could in some cases be completed without duplication of an entire table, but, instead, only the rows that are moved to a new partition (e.g., in an added node or in an existing node) exist in two places in memory or storage. For example, when the table reorganization module is used in combination with an add node operation, this means that no extra data storage is used on the original older nodes. Further, it may be useful to provide a no-extra-storage-on-old-nodes property because adding a node is often a reaction to a shortage of old nodes.

Many storage engines support a number of differing mechanisms for partitioning tables including by data ranges (e.g., partition a table into 12 partitions coinciding with the months of the year), by use of linear hashing, by modulo hashing, and the like. Linear hashing only needs to split a bucket or partition when adding a new bucket or partition, but linear hashing introduces a skew in data distribution among the data buckets or partitions. An advantage in partitioning by linear hashing is that the adding, dropping, merging, and splitting of partitions is made much faster, which can be beneficial when dealing with tables containing extremely large amounts of data. But, as mentioned above, a disadvantage is that data is less likely to be evenly distributed between partitions as compared with the distribution using modulo hashing in partitioning. Modulo hashing has no skew of data, but, unfortunately, all rows of a table need to be moved when the number of buckets or partitions is changed.

To understand partitioning using linear hashing and modulo hashing, it may be useful to consider a simple example. Consider the following data ('id', 'name'), where the primary key is 'id' that may make up the rows of a table with two fields or columns: (1, "Tomas"); (2, "Kent"); (3, "Jonas"); (4, "Frazer"); (5, "John"); (6, "Eliza"); (7, " "); (8, " "); (9, " "); (10, " "); (11, " "); and (12, " "). When this set of data is stored by a storage engine (such as within a MySQL Cluster with the ndb storage engine), the data may be separated onto different nodes. For example, the storage engine may use a modulo hashing distribution for storing the data in two buckets on two nodes, and the data may look like: Node 1—(1, "Tomas"); (3, "Jonas"); (5, "John"); (7, " "); (9, " "); and (11, " ") and Node 2—(2, "Kent"); (4, "Frazer"); (6, "Eliza"); (8, " "); (10, " "); and (12, " "). For a three node configuration, the data may be distributed as: Node 1—(1, "Tomas"); (4, "Frazer"); (7, " "); and (10, " "); Node 2—(2, "Kent"); (5, "John"); (8, " "); and (11, " "); and Node 3—(3, "Jonas"); (6, "Eliza"); (9, " "); and (12, " "). This example has been simplified, and, in practice, modulo hashing involved taking the modulo of the hash of the primary key (rather that of the primary key itself as it may appear here). It can be seen that the data is evenly distributed in both cases with each partition having 6 rows in the first example and each partition having 4 rows of data in the second example. However, the data resides very differently on three nodes compared to two nodes with only four data entries being on the same node in the 2 cases (i.e., (1, "Tomas"); (2, "Kent"); (7, " "); and (8, " ") are on the same nodes in each partitioning implementation). Even distribution is desirable but reshuffling of data or all rows when adding nodes or partitions can make online addition of nodes or reorganization of partitioned tables expensive, e.g., if 1 gigabyte of data is stored in a partitioned table, adding a node using modulo hashing may require 1 gigabyte of data to be moved.

Alternatively, the storage engine may use a linear hash partitioning for storing this same data in two buckets on two nodes, and the data may look like: Node 1—(1, "Tomas"); (3, "Jonas"); (5, "John"); (7, " "); (9, " "); and (11, " ") and Node 2—(2, "Kent"); (4, "Frazer"); (6, "Eliza"); (8, " "); (10, " "); and (12, " "). For three nodes, the partitions or buckets may be: Node 1—(1, "Tomas"); (5, "John"); and (9, " "); Node 2—(2, "Kent"); (6, "Eliza"); and (10, " "); and Node 3—(3, "Jonas"); (4, "Frazer"); (7, " "); (8, " "); (11, " "); and (12, " "). In another implementation of linear hashing, one of the original nodes may have the same entries as it had before or originally, while the other original node may have half of its original entries with the other half being on the new node. The 3-node partitioning example shows the desirable property that Nodes 1 and 2 do not have any new data as compared to the 2-node configuration. It is, however, evident that the distribution of data is very uneven and skewed when we have 3 nodes. This is apparent with Node 3 having twice as many data entries or rows as Node 1 and Node 2.

Conventional methods of partitioning including use of linear hashing and modulo hashing have significant drawbacks. For example, linear hashing as may be used in partitioning tables with database storage engines (such as MySQL™ NDB Cluster storage engine) allows for minimal copying during a table reorganization (such as to add a node to a clustered data store). However, linear hashing does not give an even data distribution unless the new number of nodes/buckets is some power of two times the original number. Use of modulo hashing distributions provides even distribution over the nodes or partitions on such nodes, but it often requires a great deal of data shuffling as the data on the original nodes is not retained.

SUMMARY OF THE INVENTION

Briefly, a partitioning method is provided to address at least some of the above problems with a new partitioning technique and/or module that may be termed HashMap partitioning or a HashMap partitioning module, and this HashMap partitioning may be used by storage engines in shared-nothing and other RDMS data storage architectures or systems. The HashMap partitioning generates a distribution mapping for a new partitioning that facilitates performing an online altering or modifying of the partitioning of a table. In addition, the HashMap partitioning uses minimal data copy and a minimal need for extra storage or space in the original data storage nodes/devices during the altering or reorganization process (e.g., during an online node add). All of this is done while maintaining an even distribution of data in the partitions of the storage nodes. For example, when a storage engine uses a HashMap partitioning module together with adding database nodes in a shared-nothing cluster such as a MySQL™ Cluster, no additional storage on the existing nodes is needed while the repartitioning of the table is performed to incorporate the new nodes and copy/move data from old to new partitions/nodes.

More particularly, a computer-based method is provided for reorganizing a database such as providing partitioning upon addition of a node to a data storage cluster. The method includes providing a data storage cluster with first and second nodes, and storing a table of data in the data storage cluster with a first partition storing a first set of rows or data elements in the first node and a second partition storing a second set of rows or data elements in the second node. The method also includes modifying the data storage cluster to include a third node for storing data from the table. A storage engine may be included in the storage cluster to manage the nodes and data storage, and the method may include adding a third partition to the table including using a partitioning mechanism to create a distribution mapping for data elements in the first, second, and third partitions. The method then includes copying a portion of the first and second rows of the table from both the first and second nodes to the third partition of the third node based on the distribution mapping. Then, the copied portion of the first and second rows is deleted from the first and second nodes. Prior to the deletion of copied rows, the method may include switching over distribution to use the first, second, and third partitions for data transactions according to the new mapping, and also waiting for scans using prior distribution of the first and second partitions to finish.

In the method, the distribution mapping does not require additional storage space for the first and second nodes as the copying is from the first and second nodes (the old nodes) and does not involve copying to or onto the first and second nodes (e.g., these nodes retain data and only lose data that is moved to the new node/partition). In some embodiments, the distribution mapping provides uniform distribution of the data elements (or rows) over the first, second, and third partitions, with "uniform" distribution involving relatively even distribution over the partitions. Perfectly uniform or equal distribution may not be possible in all settings such as those where number of data entries is divisible by the number of partitions (e.g., 25 data entries may be stored in 4 nodes and "uniform" distribution may involve 3 nodes storing 6 data entries and 1 node storing 7 data entries) such that uniform distribution does not require equal distribution of data but, instead, involves a close to even spreading of data entries over partitions (e.g., a node typically would only have one to several data entries more than another partition). This may be achieved by having the partitioning mechanism use modulo hash partitioning as a function of the data elements (and not as a direct function of the number of partitions in the table). The partitioning mechanism may be thought of as combining hash and list partitioning such that uniform distribution is achieved but data is also retained on the original or old partitions rather than requiring significant data copying/shuffling.

DETAILED DESCRIPTION OF THE PREFERRED EMBODIMENTS

Briefly, methods and systems described herein provide enhanced partitioning of data, such as a database table that is distributed over a number of nodes. The partitioning techniques described can be useful when a data storage node is being added (e.g., the system is being expanded in size to support storage of growing amounts of data). For example, clustering is a way of scaling by distributing load over many servers, and clustered computer systems or networks are used to allow several to many hosts to appear as a single server of data. The following description provides specific clustering examples that use the MySQL™ NDB Cluster storage engine, which is a distributed, in-memory, shared-nothing storage engine with synchronous and automatic data partitioning across the nodes of the clustered data store or system, but it will be understood that the partitioning techniques described are useful in nearly any data storage system in which data is partitioned and it is useful to alter the partitions over time. When a storage engine or similar component manages data that is distributed over different nodes, the methods and systems described herein provide a partitioning module or mechanism that allows the storage engine to decide how to reorganize the distributed data into useful partitions (e.g., to properly horizontally partition a table of data).

The partitioning problem may arise, for example, when a data storage system is designed to be able to grow or expand, and, when practical, is designed to allow the growth to occur online. As discussed above, the use of modulo hashing to partition a table (or hash partitioning) is useful in that it provides an even distribution of data, but when one or more nodes are added to a clustered or other data store, all the data has to be reshuffled or moved to reflect a new partitioning, which may result in large amounts of data having to be copied and reorganized. The partitioning method proposed here involves combining carefully selected aspects of hash and list partitioning to provide a new HashMap partitioning that may be used online such as by a storage engine or other database management mechanism/tool to partition data more efficiently. The HashMap partitioning method (and associated software module/mechanism) provides benefits of both the modulo hashing technique in that data is relatively evenly distributed and linear hashing techniques in that large amounts of data do not have to be copied or moved. As will become clear, HashMap partitioning provides better utilization of hardware including storage and facilitates quicker reproduction and reorganization of data such as during a node add process.

Figure 1:
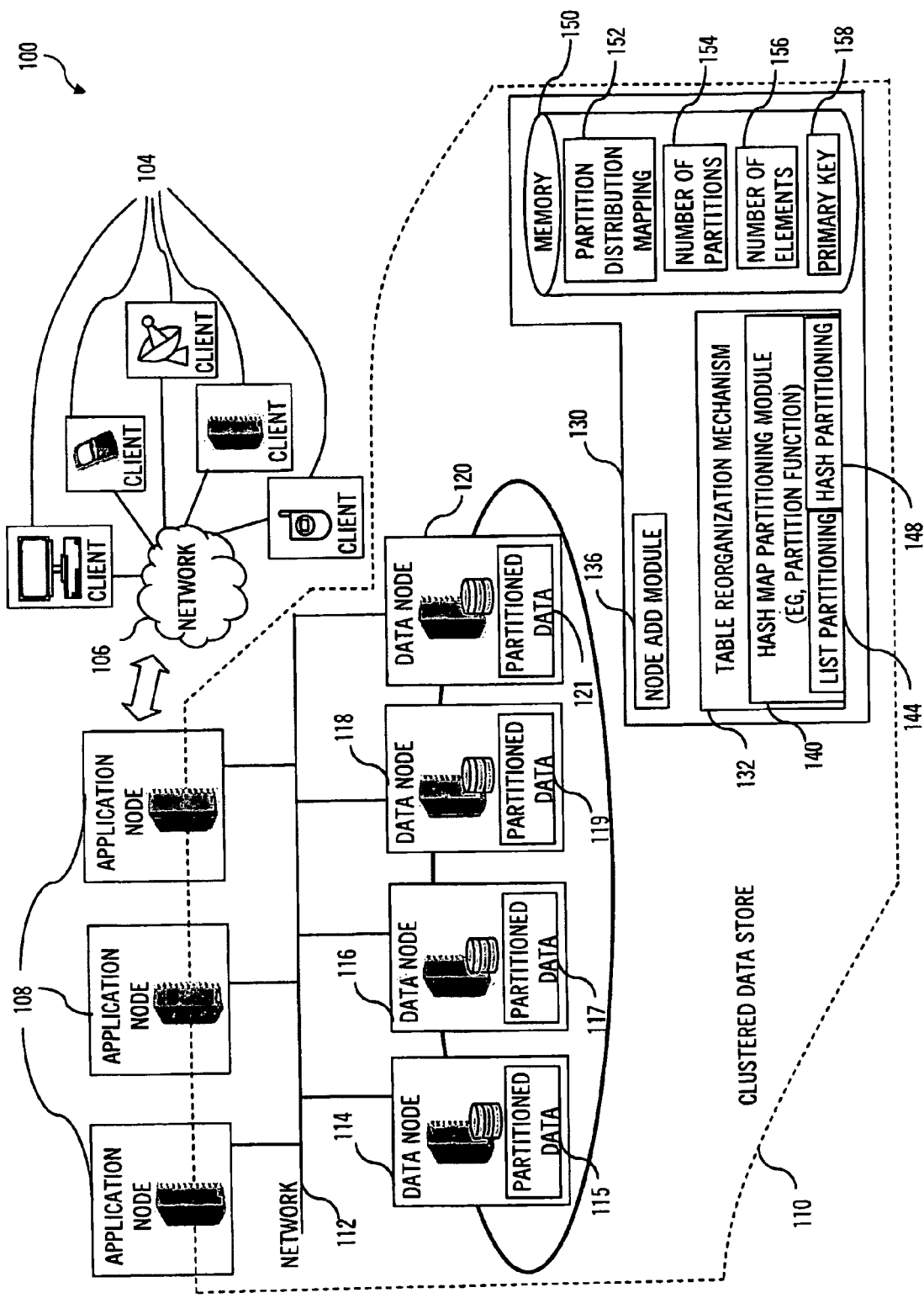
FIG. 1 illustrates a functional block diagram of a computer system or network including a clustered data store with a plurality of data nodes used to store partitioned data (e.g., databases or tables that are horizontally partitioned or the like) and a storage engine adapted for partitioning a table of data, e.g., as part of a node add process.

FIG. 1 illustrates a partitioned data storage network or system 100 useful for implementing one or more embodiments of the invention. The data storage system 100 includes a number of clients 104 that communicate with a number of application nodes 108 via one or more digital communications networks 106 (e.g., local area networks, wide area networks, the Internet, and so on with wired or wireless connections and/or data transfer). The application nodes 108 store and access data in a clustered data store 110 and communicate via network 112 with a plurality of data nodes 114, 116, 118, 120 storing partitioned data 115, 117, 119, 121 (e.g., horizontal partitions of one or more data tables). The clustered data store 110 is managed, at least in part, by storage engine 130 (e.g., a MySQL NDB Cluster storage engine or the like), and the storage engine 130 includes a table reorganization mechanism 132 that utilizes a HashMap partitioning module (e.g., with a partition function) 140 to determine how to partition data 115, 117, 119, 121.

The partitioning of data in the data store 110 on nodes 114, 116, 118, 120 may be modified, for example, when a node add module 136 is utilized by the storage engine 130 to add a node(s) to the data store 110. Typically, the storage engine 130 supports both list partitioning 144 and modulo hashing or hash partitioning 148 with operation of the HashMap partitioning module 140 to achieve effective online partitioning (e.g., such as partitioning data when the nodes 118, 120 were added to the data store 110 with minimal data copy and with substantially even or "uniform" data distribution in the four nodes 114, 116, 118, 120). As part of managing the partitioning or reorganization of data, the table reorganization mechanism 132 may access memory or data storage 150 that stores a partition distribution mapping 152 indicating which portions of a table (e.g., rows or data entries) belong in each partition or node, a number of partitions 154 to be used (typically one partition per node to be used to store a data table), a number of data elements 156 (e.g., data entries/rows), and a primary key 158 (e.g., a unique identifier for a data entry) to be used in the partitioning process. In typical implementations, the partitioning module 140 may not need to know the data element number 156 but may instead access the following information from storage 150: the current number of map entries, how the entries map to existing partitions, and how many partitions to redistribute to.

The clients 104 may take a variety of hardware forms such as personal, laptop, notebook, and other computers or computing devices, cellular phones, personal data assistants, servers, and so on. The clients 104 may utilize a wide variety of interfacing software applications including, but not limited to, Java Database Connectivity (JDBC™), Open Database Connectivity (ODBC), NDB API, Lightweight Director Access Protocol (LDAP), webservices, and the like. The clients 104 may transmit database queries or other data requests over the network(s) 106 to the application nodes 108. The application nodes 108 may also be implemented in or using a variety of computers or computing devices such as servers using one or more of NDB API, MYSQL™ Server, OpenDST™, openldap, Project SailFin (Project SailFin is based on robust and scalable SIP servlets technology on top of a deployment-quality, Java EE-based GlassFish™), GlassFish™, FreeRADIUS, and others for interfacing with the clients 104 and/or with the data store 110, and the nodes 108 may run applications such as web services, search engines, and so on.

The data nodes 114, 116, 118, 120 generally will comprise servers/hosts and data storage devices such as disks, disk arrays, tape-based storage devices, optical data storage devices, and the like. The storage engine 130 may run on one or more of the data nodes 114, 116, 118, 120 or may run on another device that may be adapted with one or more processors managing operation of input/output devices and data storage/memory and running software modules or programs that may be provided via computer-readable medium adapted to cause a computer or the system 100 or data store 110 to perform the functions described herein. In this discussion, computer and network devices and data store devices are described in relation to their function rather than as being limited to particular electronic devices and computer architectures. To practice the invention, the computer devices and network devices may be any devices useful for providing the described functions, including well-known data processing and communication devices and systems such as desktop computers, and even personal digital assistants, personal, laptop, and notebook computers with processing, data storage, and input/output components, and server devices configured to maintain and then transmit digital data over a communications network. Data, including device qualification data, device simulation data, event messages/files simulating device operations in response to device qualification data, and transmissions to, from, and within systems is typically communicated in digital format following standard communication and transfer protocols, such as TCP/IP, HTTP, HTTPS and the like, but this is not intended as a limitation of the invention.

A useful approach to explaining the operation of the system 100 may be to continue with the relatively simple example from the background section. In this example, storage was provided for data ('id', 'name'), where the primary key is 'id' that may make up the rows of a table with two fields or columns: (1, "Tomas"); (2, "Kent"); (3, "Jonas"); (4, "Frazer"); (5, "John"); (6, "Eliza"); (7, " "); (8, " "); (9, " "); (10, " "); (11, " "); and (12, " ") and the set of data was stored by a storage engine on different nodes. Now, instead of modulo hash partitioning, data partitioning may be performed with the storage engine 130 using the HashMap partitioning module 140. In this example, it is assumed that two of the nodes 114, 116 are initially being used to store a table of data that is horizontally partitioned into two partitions 115, 117. The partition of data 115, 117 on nodes 114, 116 may take the form: Node 114—(1, "Tomas"); (3, "Jonas"); (5, "John"); (7, " "); (9, " "); and (11, " "); and Node 116—(2, "Kent"); (4, "Frazer); (6, "Eliza"); (8, " "); (10, " "); and (12, " ").

According to one or more embodiments, the storage engine 130 may call the table reorganization mechanism 132 to reorganize the partitioned data such as to add data node 118 via the node add module 136. In this regard, the HashMap partitioning module 140 is called. It retrieves the primary key 158 (e.g., the identifiers 1, 2, 3, and so on), the number elements 156 in the table (e.g., twelve in this example), and number of partitions desired 154 (e.g., 3 partitions after reorganization). The HashMap partitioning module 140 then generates a partition distribution mapping 152 that may be used by the table reorganization mechanism 132 in reorganizing the partitioned data 115, 117 from two partitions/nodes to partitioned data 115, 117, 119 with three partitions/nodes. The partitioning may take the form of: Node 114—(1, "Tomas"); (5, "John"); (9, " "); and (11, " "); Node 116—(2, "Kent"); (6, "Eliza"); (10, " "); and (12, " "); and Node 118—(3, "Jonas"); (4, "Frazer); (7, " "); and (8, " "). In this partitioning or reorganization of the data in the table, it can be seen that the number of elements is twelve and the number of partitions is three, and the HashMap partitioning module 140 is able to create a partition distribution mapping 152 indicating in which data partition each entry or row should be stored. It is seen that an even distribution of data here 4 data entries per node but this example can, of course, be applied to tables with thousands to millions or more data entries across many nodes). This example also shows that the mapping 152 provided by partitioning module 140 is such that node 114 and node 116 keep the same data in the two and three node partitioning configurations of the data table (with the exception of the data from each node 114, 116 that was moved to node 118).

To further understand one benefit of having the data stay in the same place/node as in the latter example, it may be useful to describe operation of the table reorganization mechanism 132 when performing online reorganization of data from two to three nodes. An initial step may be to setup triggers to capture changes of the data in the table affected by the reorganization (e.g., a table with partitions on one or more of the nodes 114, 116, 118, 120 of data store 110). The trigger(s) may be adapted to make sure that the same change happens to the data that is copied during a copying step. Then, a copying step may be performed by the reorganization mechanism 132 to copy data from the old partitioning to the new partitioning (e.g., in the above 3-node example, data is copied from node 114 and node 116 to node 118 to create the third partition in node 118). The old partitioning of two nodes is changed to the new partitioning of three nodes by the storage engine 130 and/or the reorganization mechanism 132. Next, the old partitioning may be deleted (e.g., the data entries no longer needed on the first two nodes, in the above example, may be deleted).

As a result of this partitioning technique, the retention of data at original or existing nodes provides benefits in performing the step or process of copying data to the new partition or node. It should be understood that no new storage is needed to keep the copy of the new data partitioning in the existing nodes. To understand why this is so, it may be helpful to look at a smaller data partitioning example in which conventional modulo hashing is utilized to form a new partitioning or distribution mapping. In this example, the old partitioning of data may call for two partitions 115, 117 on nodes 114, 116 appearing as: Node 114—(1, "Tomas"); (3, "Jonas"); and (5, "John"); and Node 116—(2, "Kent"); (4, "Frazer"); and (6, "Eliza"), for a table with 6 entries or rows and a primary key of the integers 1 to 6. Using modulo hashing to add a node and provide three partitions of data 115, 117, 119 on nodes 114, 116, 118 may provide the following new partitioning: Node 114—(1, "Tomas") and *(4, "Frazer"); Node 116—(2, "Kent") and *(5, "John"); and Node 118—*(3, "Jonas") and *(6, "Eliza"). Note, the actual data to be copied to the new partitioning is marked with an "*". The other, unmarked data already resides on the node in the old partitioning and does not need to be copied. The example shows use of extra storage in performing modulo hash-based partitioning.

In contrast, using the HashMap partitioning module 132 provides a more ideal setup of new partitioning or reorganization of the table of data distributed in the clustered data store 110. Specifically, the old or original partitioning is again: Node 114—(1, "Tomas"); (3, "Jonas"); and (5, "John"); and Node 116—(2, "Kent"); (4, "Frazer"); and (6, "Eliza"). To add a new node (node 118) to the cluster used to store the table of data, the storage engine 130 calls the table reorganization mechanism 132, which, in turn, uses the HashMap partitioning module 140 to produce distribution mapping 152 providing the following new partitioning: Node 114—(1, "Tomas") and (5, "John"); Node 116—(2, "Kent") and (6, "Eliza"); and Node 118—*(3, "Jonas") and *(4, "Frazer"). In this reorganization process, it can be seen that new storage on the original nodes 114, 116 is not used. Also, much less copying of data is performed because only the data stored in the new partition on node 118 (i.e., the added or new node) is copied from the original or old nodes 114, 116 (or from partitioned data 115, 117).

Hence, it can be seen that the HashMap partitioning module 140 creates a distribution mapping 152 that has the properties of the latter example. Also, the new table partitioning may now be used in the context of online reorganizing data in a database (e.g., a database arranged as a table that is stored in a distributed manner in clustered data store 110). The following provides one non-limiting example of the HashMap partitioning module 140 or its partition function. In the description below, P(PK) is used as the function that the module 140 or mechanism 130 uses to decide which partition (e.g., node in the examples) data or data entries should reside in, with "PK" being the primary key of the table. In the above implementation of P(PK), PK is 'id' and the P(PK) evaluates to 1, 2, or 3, corresponding to the nodes 114, 116, 118 of system 100.

A new partitioning method has been introduced, labeled HashMap partitioning here, which is based upon modulo hash and list partitioning. A storage engine 130 may support or implement modulo hashing or hash partitioning 148, and the modulo hashing function may be described with the partition function: P(PK)=md5(PK) % #PARTITIONS (wherein md5 refers to commonly used hash function sometimes labeled Message-Digest algorithm 5). In contrast, the storage engine 130 of embodiments of the invention may build upon such hash partitioning 148 by providing a HashMap partitioning 140 described with the partition function: P(PK)=map[md5 (PK) % elements in(map)]. With this partitioning type, the partition function P(X) (or function implemented by module 140) is not a direct function of the number of partitions. As a result, adding partitions to a table does not affect the partition function, and the real reorganization is performed when switching the HashMap or partition distribution mapping 152 for a table. It will also be understood that use of HashMap partitioning with module 140 also easily supports nodes with different sizes, which is useful in some storage systems 100 when such nodes are also supported by the particular storage engine 130.

In practice, the evenness of the HashMap partitioning (e.g., uniformity that may be perfect uniformity or substantial or near evenness of distribution) may depend on the relationship between the number of map entries and the number of nodes. For example, if the number of nodes is a factor of the number of map entries then data is balanced. If not, then there may be an imbalance (although this imbalance is still typically considered "uniform" for the sake of this description and the following claims). The resulting imbalance as a percentage is given by the equation 100/CEILING((#MAP_ENTRIES/#NODES), 1). In some embodiments, a selection of 240 is made as a default number of map entries as part of the design of the system 100 in part because the number 240 has factors including 1, 2, 3, 4, 5, 6, 8, 10, 12, 15, 16, 20, 24, 30, 40, and 48.

Figure 2:
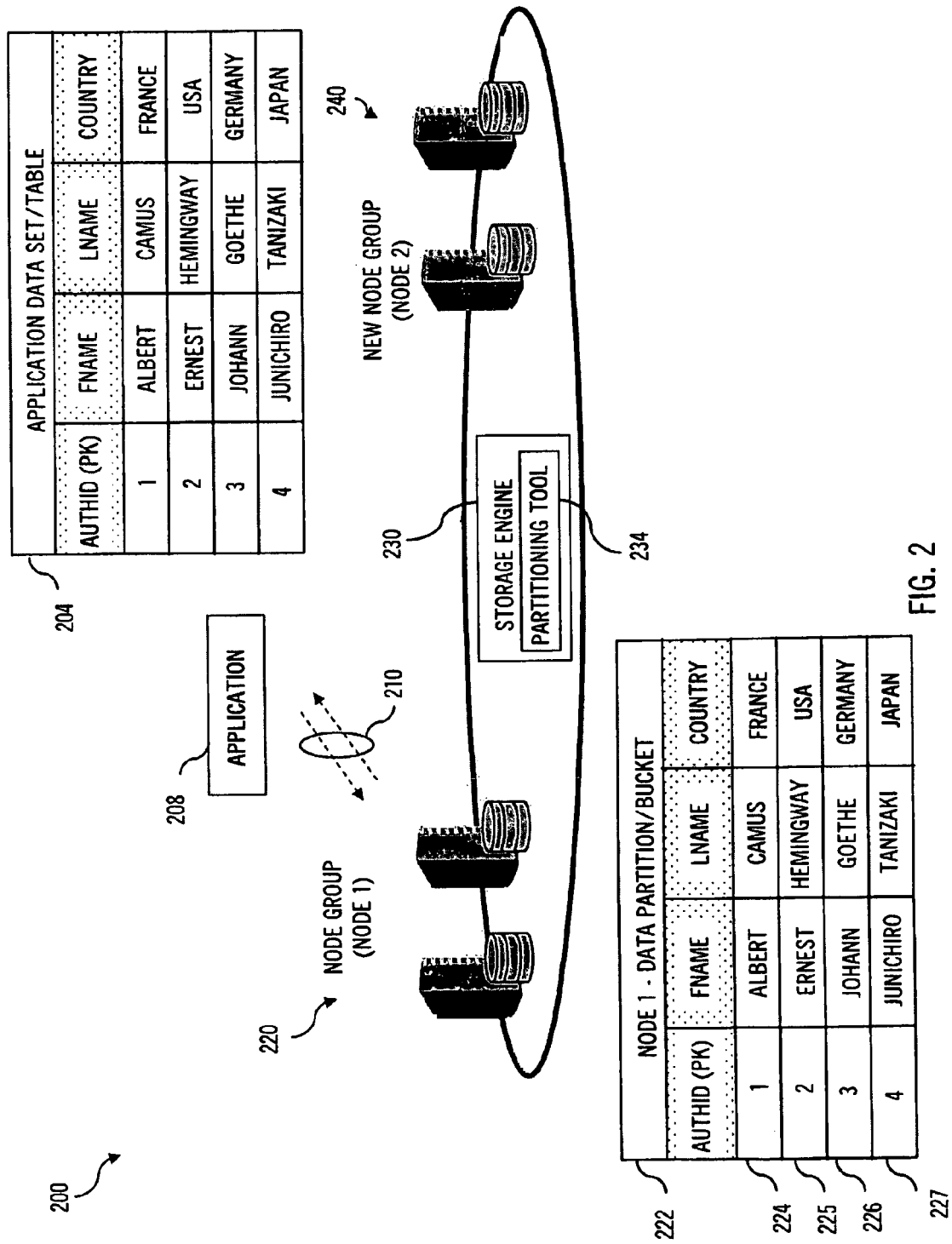
FIG. 2 illustrates a functional block or schematic diagram of computer system or network with a data or storage node used to store an application data set or table in a single partition but showing addition of a second node or node group to the storage cluster.

FIGS. 2-5 provide another working, but not limiting, example of operations of a data storage system that is used to provide online adding of a node (or a node group of two or more nodes providing data backup or replication) and in which partitioning of data is performed using HashMap partitioning rather than conventional modulo hashing. FIG. 2 schematically illustrates a data storage system 200 used to support an application 208 in storing/accessing an application data stet or table 204. The data table 204 is shown to be a relatively simple database with four columns including fields for an identifier that may be used as the primary key, a first name, a last name, and a country, and the table 204 is shown to include only four data elements or entries to simplify explanation of partitioning of data but numerous data elements or entries typically would be present. The application 208 may communicate as shown at 208 with data storage or clustered data storage that includes a first node group 220, such as to transmit the data of table 204, to query the stored table, or modify the table.

The node group 220 is shown to include two data storage devices/systems (e.g., a server and disk array or the like), and each node in the group 220 (labeled Node 1) is shown to store a copy of the table 204 in a data partition or bucket 222, with entries/rows 224, 225, 226, 227. A storage engine 230 is provided to manage operation of the node group 220 including partitioning of data, with FIG. 1 showing the system 200 using one node group 220 and one partition 222 on that node (i.e., Node 1) to store all of the data in table 204. In performing the partitioning, the engine 230 uses the partitioning tool 234, which is adapted to implement HashMap partitioning as described above as a combination of hash and list partitioning to create a partition distribution map that defines which partitions or buckets data is placed in system 200. The storage engine 230 may be operated/commanded by a system manager (or in response to communications 210 from application 208) to begin an add node (or add group node) online process. As shown in FIG. 2, a new or second node group 240 is added to the data cluster of system 200 and made available to the storage engine 230.

Figure 3:
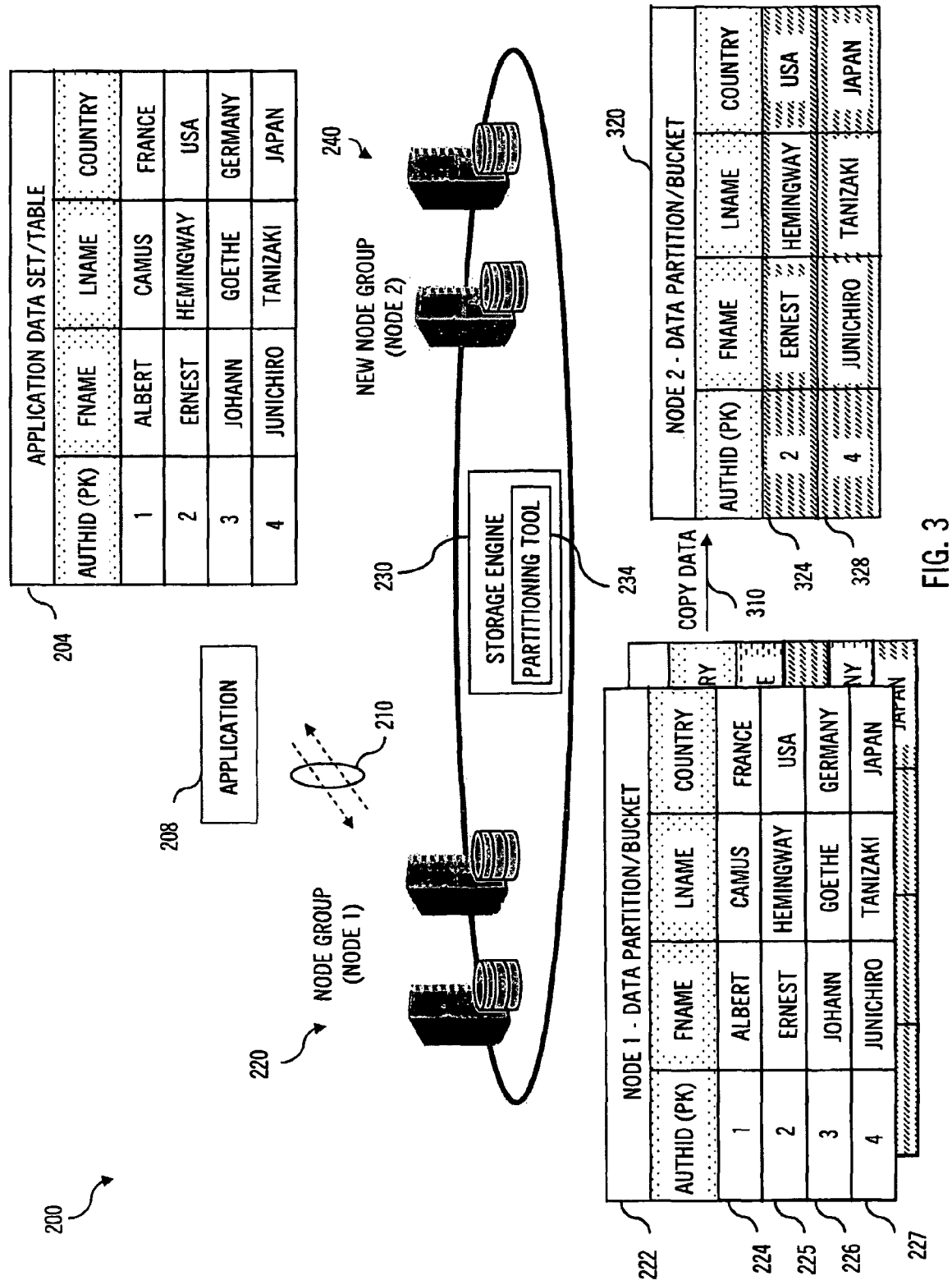
FIG. 3 illustrates the computer system or network of FIG. 2 after a distribution mapping has been generated by a partitioning tool run by the storage engine showing the copying of data to the newly added node (e.g., to create a second partition or bucket for the application data)

In FIG. 3, the storage system 200 is shown after the partitioning tool 234 has been used to generate a distribution mapping. As discussed above, the partitioning is performed in a manner that provides more uniform or even distribution among the nodes or node groups 220, 240 and also limits additional storage by retaining entries on the original partitions/nodes (except that which is moved to the new partition). As shown, the partition distribution mapping calls for two rows or data entries to be stored in each partition 222, 320 after online add node operations are complete (e.g., after partitioning or reorganizing data). The entries 224, 226 with primary keys 1 and 3 are retained on the first node 220 or partition 222 and the entries 225, 227 with primary keys 2 and 4 are mapped to the new partition 320 in the added node 240. FIG. 3 also illustrates copying of these data entries 324, 328 into partition 320 as shown at step 310. As shown, no extra space or storage is used on the existing nodes or the nodes of node group 220. In a more typical example, a plurality of nodes would not be forced to provide space to support the new partitioning by having data copied to them from other existing nodes as part of a large data reshuffling.

Figure 4:
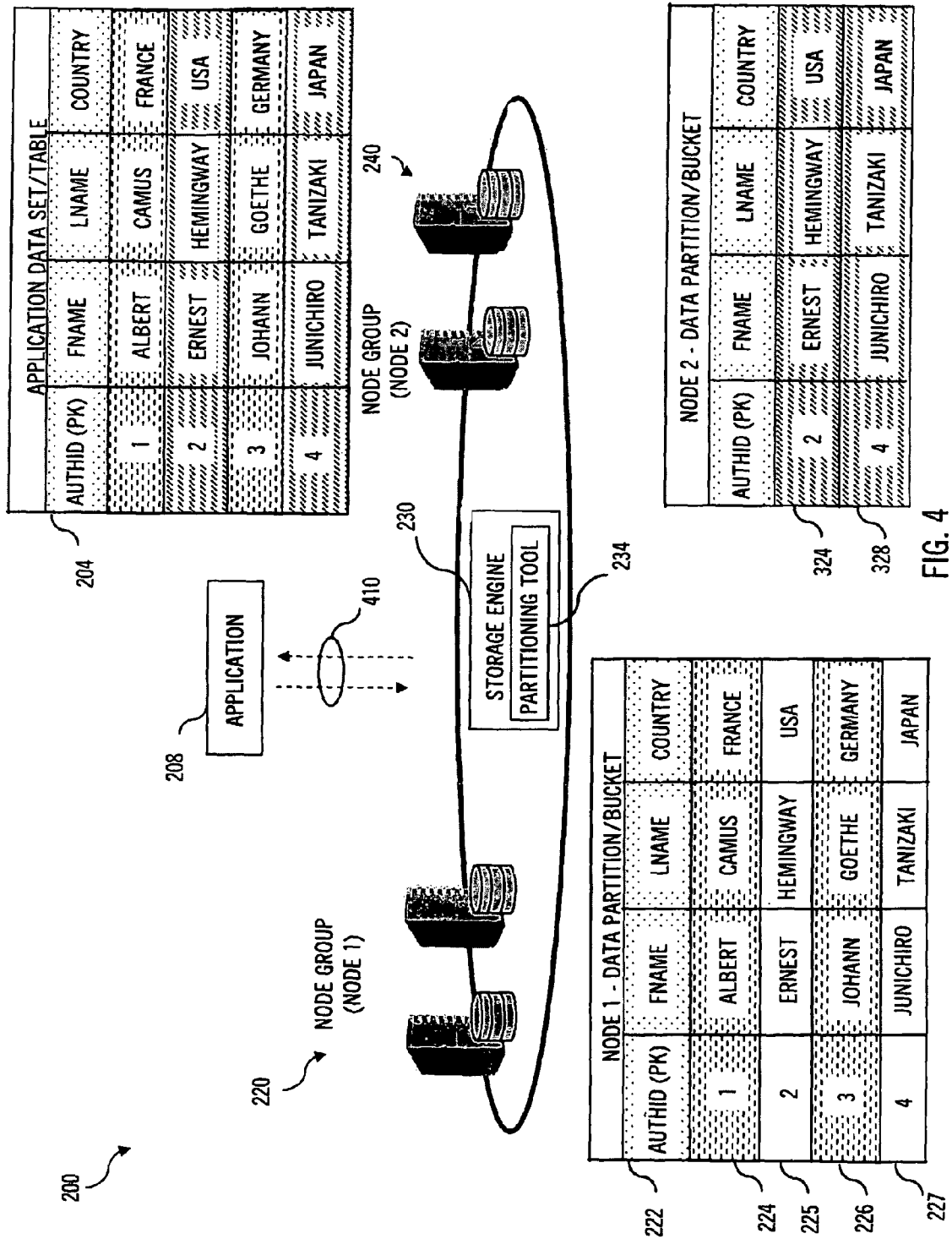
FIG. 4 illustrates the computer system or network of FIGS. 2 and 3 after data copying with data distribution switched to reflect the use of two partitions.

FIG. 4 shows the storage system 200 after copying of data from the original node 220 to the new or added node 240 is complete. Also, the storage system 200 shows that distribution 410 is being switched to reflect the use of two data partitions or buckets 222 320 for the data from (or accessed by) application 208. As shown, the node 222 still contains all original data entries 224, 225, 226, 227 after the copying and even as or after the switching of the distribution to the new partition distribution mapping. In part, this is because the partitioning techniques described herein may call for the storage system 200 (or storage engine 234) to complete the running scans (or wait for running scans to complete) prior to taking a next step in the reorganization. For example, the next step may involve deleting all data or entries that were previously copied to the new partition 320 from the original partition 222.

Figure 5:
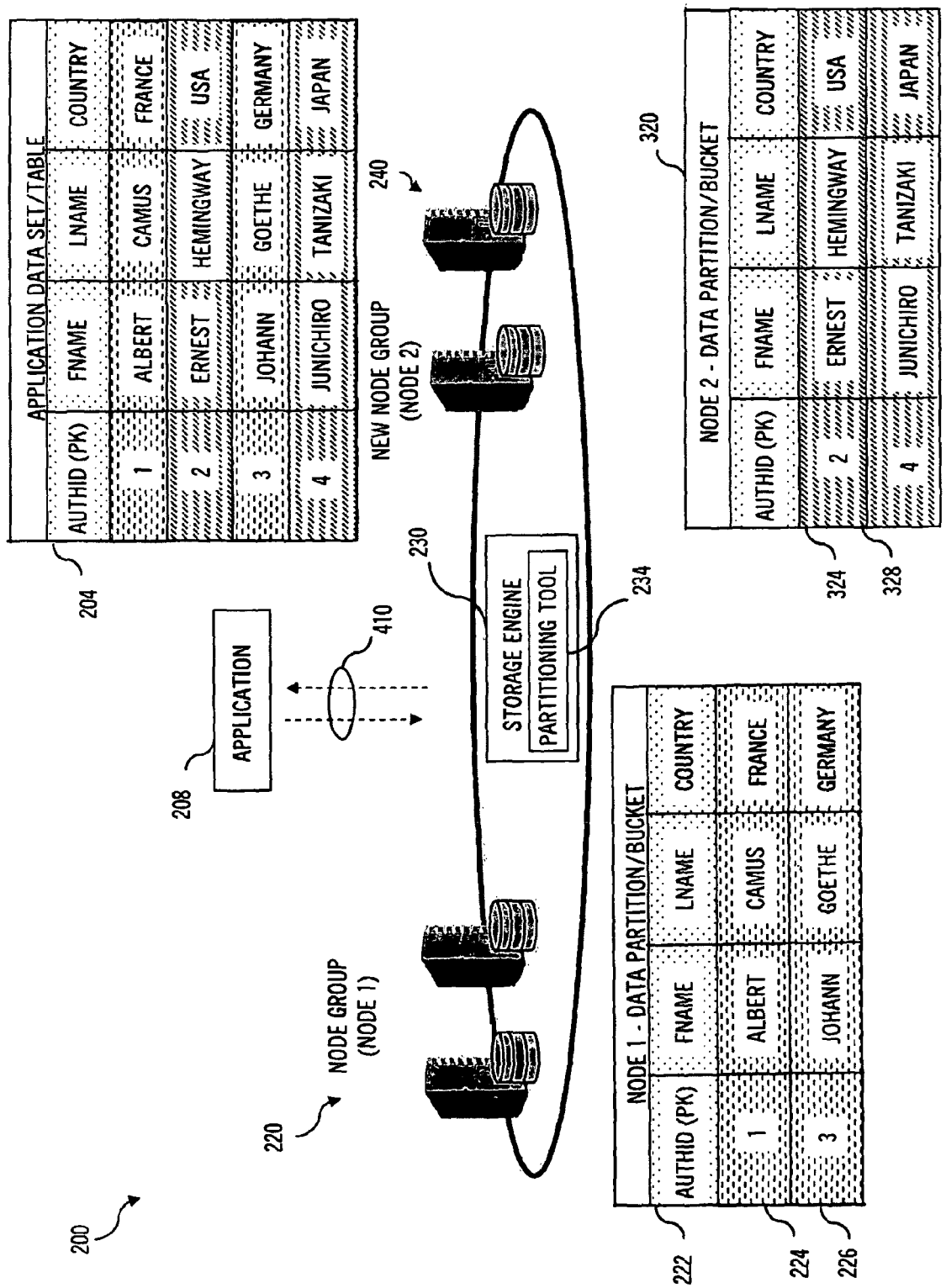
FIG. 5 illustrates the computer system or network of FIGS. 2-4 after previously copied rows or data entries have been deleted from the original older node.

FIG. 5 illustrates the storage system 200 after completion of the deleting of rows 225, 227, which were copied to partition 320 as rows/entries 324, 328, from the old or original partition 222. In FIG. 5, the reorganization of the storage system 200 has been completed and partitioning was performed as part of adding node group 240 in an online add node. The process was completed in an efficient manner without using additional space in the storage of the original node 222 while providing uniform (i.e., substantially, but often imperfect or somewhat uneven or imbalanced) distribution of the data entries. These two aspects may be provided by the partitioning tool utilizing HashMap partitioning in which generating a partition distribution mapping is performed using modulo hashing as a function of the number of entries or elements in the table or map rather than as a function of the number of desired partitions.

Figure 6:
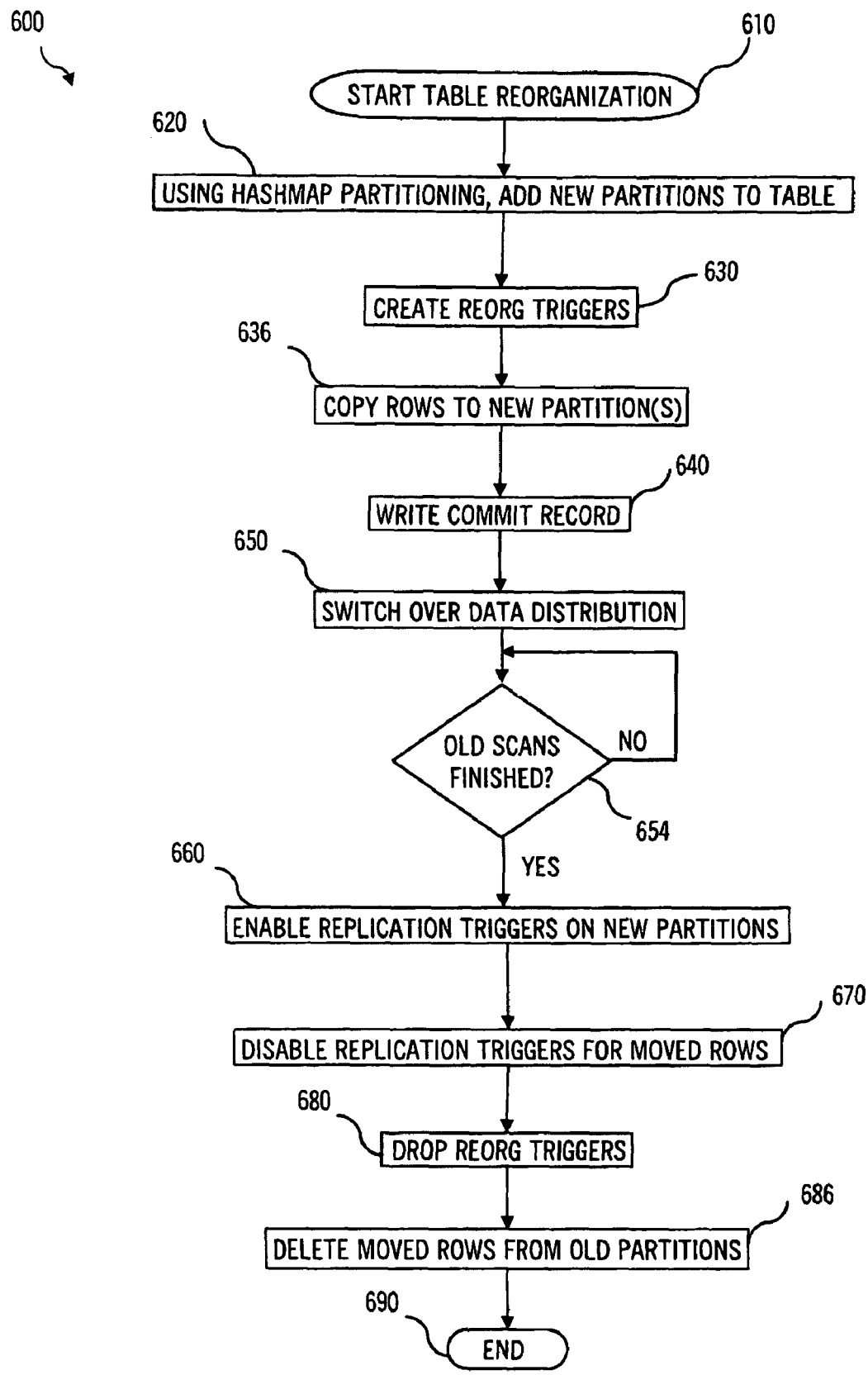
FIG. 6 is a flow chart of a table reorganization that may be performed using HashMap partitioning, e.g., as part of or concurrent with a node add process.

FIG. 6 illustrates steps or processes that may be performed during a table or data reorganization within a data storage system or network, such as by steps carried out by a storage engine managing partitioning and storage to nodes within a clustered data store to provide data in databases to applications. The method 600 begins at 610 with a determination to reorganize a table of data. This may occur when it is determined that additional nodes may be useful in storing the table data, such as when the size of a data set exceeds a particular size to facilitate searching or otherwise utilizing the data entries in the table. The method 600 continues at 620 with using HashMap partitioning as discussed above to add one or more new partitions to a table. For example, an existing table may be horizontally partitioned into eight partitions with each partition stored on a different node, and it may be determined that the data should be further partitioned to ten, twelve, or more partitions on a similar (or different) number of nodes. In step 620, the HashMap partitioning mechanism or partition function is used to generate a new partition distribution mapping of the data (e.g., modulo hashing performed as a function of the number of data elements or in combination with list partitioning) that provides for uniform distribution (i.e., at least relatively even distribution which may include perfectly uniform distribute or somewhat imbalanced distribution as discussed above) of the data over the nodes and, typically, retains data upon original nodes during copying/reproduction steps (to avoid using additional space on the original or old nodes).

The method 600 continues at 630 with creating reorganization triggers. These triggers are typically adapted to transfer data used to maintain and organize the table data from the old partitions to the new partitions. For example, data manipulation language (dml) statements (which are statements used to store, retrieve, modify, and erase data from a database) associated with the affected data entries may be transferred from the original or old table partitions to the new or added partitions (or associated nodes) such that an update on a row that will/should move from the old to the new partition is applied to both copies (e.g., the copy still in the original/old partition as well as the copy newly created in the new partition). At step 636, the rows or data entries identified by the new distribution mapping (or HashMap partitioning) for moving to the new or added partition(s) are copied from the one or more old or original partitions to the new or added partition. In step 640, the commit record is written or a step is taken to commit transactions (e.g., transaction statement such as SQL statements that have changed data and have been entered by the storage engine (e.g., by NDB Cluster storage engine) but have not yet been saved).

Method 600 continues at 650 with switching over to the new data distribution such that new partitions are used for transactions/scans, and, in some embodiments, step 650 may involve simultaneously altering trigger-based change propagation to be from the new partitions back to the old partitions. At step 654, the method 600 involves waiting for scans using the old distribution to be finished before continuing with the process 600. At 660, the method 600 includes enabling replication triggers on the new partitions. At 670, replication triggers for the moved rows are disabled on old partitions on epoch boundaries. In step 680, reorganization triggers are dropped, and, then at 686, the method includes scanning/deleting the moved rows from the old partitions. The method 600 ends at 690 such as with cleanup of miscellaneous storage system resources.

Errors may occur during table reorganization, and error handling may be provided by a storage engine to require that anything that goes wrong before the commit step 640 is performed results in reorganization being rolled back. A node failure is typically not considered something that goes wrong for error handling. A complete cluster crash before the commit step 640 may make the cluster or storage engine perform a rollback on a subsequent cluster start. A complete cluster crash after the commit step 640 (but before completion at 690) may make the cluster or storage engine perform rollforward on a subsequent cluster start.

As can be seen from the above description, the systems and methods support "online" redistribution in the sense that correctness is maintained or maintenance of correctness is facilitated during the change. Correctness is described in terms of users of the system with an indication of how the various mechanisms of the systems and processes of the methods meet the correctness description or definition. With this in mind, the following provides further discussion of the "row change event" mechanism and the Global Checkpoint mechanism, with some examples being more relevant to Ndb Cluster or similar embodiments.

Prior to providing this additional explanation, it may be useful to first discuss aspects that make at least some of the described embodiments "online" table/data reorganization methods and systems. Illustrative aspects that may make for "online" reorganization include: (a) read/write transactions start, run, and commit throughout the operation; (b) no inconsistent data is observed with all operations observing the effects of preceding operations and scans observing all relevant rows once and only once; and (c) no updates are lost in part because row change event subscribers continue to receive a consistent stream of row change events throughout.

Regarding correctness of "online" operations (and, particularly correctness of operations of a Ndb Cluster), all nodes in the system typically should have a compatible view of the system at all times to ensure that rows inserted by one node can be reliably found by another node. Operations executing on the system include single-row read and update operations and multi-row read-only operations (scans), where key ranges and/or whole partitions of rows are read. For single row operations, it is useful that, at all times, all row locking and row updates are visible to all or substantially all subsequent transactions (e.g., correctness requirement "R1"). For multi row operations, it is also useful that, at all times, all or substantially all of the rows included in the range or partition specified are found, with none missing and no duplicates (e.g., "R2").

Ndb Cluster currently implements a "Global Checkpoint" protocol (GCP), which is used by nodes to agree on consistent points in time in the stream of changes occurring in the distributed system. In each round of the GCP, nodes agree on the set of committed transactions to be included in a Global Checkpoint (identified by a numeric Global Checkpoint Identifier (GCI) or epoch.). The GCP mechanism allows the stream of changes to be split into discrete units, with the system in a consistent state between each set of changes. This mechanism is also used to coordinate system state changes so that all transactions committed before GCI x operate in system state y and all transactions after and including GCI x operate in system state y>1. This can simplify the correct implementation of online system state changes such as table redistribution. In general, it is probably sufficient that the system can agree on a single point in time to perform the "commit" action and can clearly identify which operations were initiated before and after this point of time.

Additionally, Ndb Cluster supports a row change event API, where details of changes to rows (such as Insert, Update, Delete) are collected and made available to users as a stream of row change events. The stream of row changes can be used to implement secondary replication, logging, log mining, and other mechanisms. It is useful that this stream: contains all changes made to rows in a table with none missing (e.g., "R3"); contains no duplicates (e.g., "R4"); maintains the relative ordering of changes to a particular row as specified by its key (e.g., "R5"); and provides consistent transactional synchronization points in the stream of changes (e.g., "R6"). This mechanism operates by having each node in the system buffer row change information. When the GCP starts a new epoch across the system, each node then sends the buffered row change information for the last epoch to user applications (API nodes) that have subscribed for it. As each row is held by one partition (and, therefore, one node), it is relatively easy to ensure aspects or requirements R3, R4, R5 and R6 described/defined above under normal conditions.

Regarding maintaining correctness during online redistribution (again, especially for a Ndb Cluster), every node should be able to correctly determine which table partition should be consulted to insert, read, update or delete a row. With HashMap partitioning, this involves hashing the row's distribution key values, dividing the hash result modulo by the size of the table's HashMap, and then looking up the HashMap to determine the correct partitionId (which in itself implies the correct node ID). During redistribution, some rows are moved between partitions. To maintain the properties to provide correct online operation, the redistribution operation is split into a number of phases.

Phase 1 may be considered a process or phase of building a new partition(s). First, new partitions are created, but not used, for inserts, reads or scans. Second, synchronous triggers are placed on 'old' partitions from which rows will be moved. These immediately re-apply the triggering operation (Insert, Update, Delete) to a row in the row's new partition, ignoring missing row errors, and so on. Third, partition scans are started on old partitions to copy rows that will move to the new partitions. Fourth, once the scans complete, two copies of the rows are present that will move—one in the old partition and one in the new partition. The copies are kept precisely in-sync by the triggers. Fifth, online transactions (single and multi row operations) use the copies in the old partitions. Typically, a mechanism keeps track of how many scans are operating concurrently.

Phase 2 may involve a process or phase of preparing for commit of the new distribution. This may include first preparing for all nodes to update their table metadata with the new HashMap definition. Second, the Phase 2 process may include preparing for triggers propagating changes from old partitions to new to be reversed (propagating changes back from new partitions to old). This helps ensure online correctness requirements R1 and R2. Third, the process includes preparing for row change events to be sent from new partitions, with old partitions ignoring row changes to rows that have been "moved." This helps ensure online correctness requirements R3 and R4. Fourth, the process includes choosing a (future) GCI to perform the commit operation to help ensure online correctness requirement R5 and R6.

Phase 3 may involve the commit including steps prepared for above happen at a GCI boundary and then first all new single row operations for affected rows (read, insert, update, delete) are routed to the new partitions. Row changes are immediately propagated back to 'old' partitions to be visible to 'old' scans ensuring requirements R1 and R2. Second, all new multi row operations (scans) will occur using the new partitioning scheme (e.g., will scan old and new partitions, ignoring moved rows in the old partition). In most cases, scan requirements R1 and R2 will be maintained. Third, row change events will be collected and sent at old and new partitions. Old partition discards change events for affected rows helping ensure R3, R4, and R5. Fourth, old scans continue to scan partitions/ranges in the old partitions not ignoring affected rows. Changes occurring to affected rows in the meantime become visible to old scans due to back-propagating trigger mechanism helping ensure correctness requirements R1 and R2. Mechanism(s) keep track of how many old scans are operating concurrently, and, typically, the number cannot increase as all new scans use new partitioning scheme A Phase 4 may involve post-commit operations. Once the number of concurrent 'old scans' hits zero, there is no reason for the affected row's data to be stored in the old partitions. In a typical post-commit, first, back change propagation triggers can be dropped. Second, old partitions can be scanned, deleting affected rows. This is typically not logged or sent via the row change event mechanism. Third, various other miscellaneous cleanup occurs.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for reorganizing a table of a database, comprising:
providing a data storage cluster including a first node and a second node; storing the table in the data storage cluster with a first partition comprising a first set of rows in the first node and a second partition comprising a second set of rows in the second node;
modifying the data storage cluster to include a third node for storing data from the table;
with a storage engine managing the data storage cluster, adding a third partition to the table including using a partitioning mechanism to create a distribution mapping for data elements in the first, second, and third partitions;
copying a portion of the first and second sets of rows of the table from both the first and second nodes to the third partition of the third node based on the distribution mapping; and
deleting the copied portion of the first and second sets of rows of the table from the first and second nodes, wherein the distribution mapping calls for copying from the first and second nodes and not copying to the first and second nodes.

2. The method of claim 1, wherein after the copying and the deleting, data from the table is uniformly distributed over the first, second, and third partitions.

3. The method of claim 1, wherein the partitioning mechanism uses hash partitioning as a function of the data elements in the table.

4. The method of claim 1, wherein the partitioning mechanism comprises a partition function combining hash and list partitioning, the hash partitioning being performed without regard to a number of the partitions in the table.

5. The method of claim 1, further comprising, prior to the deleting, switching over distribution to use the first, second, and third partitions for data transactions according to the distribution mapping, wherein the deleting of the copied portion of the first and second sets of rows is performed after scans being performed based on a prior distribution of the first and second partitions are finished.

6. The method of claim 1, further comprising, prior to the copying, creating reorganization triggers that transfer data manipulation language statements to the third partition that correspond to the portion of the rows copied to the third partition.

7. A data storage system for storing rows of data in a data table, comprising:
  a server running a storage engine including a partitioning module;
  a set of original data nodes managed by the storage engine; and
  the data table of data horizontally partitioned with a partition with a set of rows in each of the original data nodes, wherein the storage engine operates the partitioning module to generate a distribution mapping defining a new partitioning of the data table when a new data node is added to the set of original data nodes, the distribution mapping providing uniform distribution of rows of the data across partitions in the new partitioning and retaining a subset of the rows of the data in each of the original ones of the original data nodes,
  wherein the partitioning module comprises a partition function that combines hash and list partitioning to create the distribution mapping.

8. The system of claim 7, wherein the storage engine copies a portion of the rows of the data from each of the partitions on the original data nodes to a partition on the new data node according to the distribution mapping without copying any of the rows of the data to the original ones of the original data nodes.

9. The system of claim 7, wherein the partitioning module implements a partition function defined by P(PK)=map[md5(PK) % elements in(map)], wherein PK is a primary key of the data table.

10. A data storage system for storing rows of data in a table, comprising:
  a server running a storage engine including a partitioning module;
  a set of original data nodes managed by the storage engine; and
  a table of data horizontally partitioned with a partition with a set of rows in each of the original data nodes,
  wherein the storage engine operates the partitioning module to generate a distribution mapping defining a new partitioning of the data table when a new data node is added to the set of original data nodes, the distribution mapping providing uniform distribution of rows of the data across partitions in the new partitioning and retaining a subset of the rows of the data in each of the original ones of the original data nodes, and
  wherein the partitioning module includes modulo hash partitioning as a function of elements in the data table.

11. A computer program product including a computer useable medium with computer readable code embodied on the computer useable medium, the computer readable code comprising:
  computer readable program code devices configured to cause a computer to add a node to a data storage cluster, wherein the data storage cluster stores a table of data in a horizontally partitioned manner over a number of nodes according to a first distribution mapping;
  computer readable program code devices configured to cause the computer to create a second distribution mapping defining partitioning of the table of data including an additional partition in the added node;
  computer readable program code devices configured to cause the computer to copy one or more rows associated with the table of data from the number of nodes to the added node, the copied rows being defined by the second distribution mapping and the copying excluding copying between the number of nodes, whereby data is retained on the number of nodes and
  computer readable program code devices configured to cause the computer to effect deleting the copied rows from the number of nodes, whereby data is retained on the number of nodes except data in the copied rows.

12. The product of claim 11, wherein the second distribution mapping defines a uniform distribution of data from the table over nodes of the data storage cluster.

13. The product of claim 12, wherein the second distribution mapping defining comprises modulo hashing data in the table as a function of elements in the table.

14. The product of claim 11, wherein the second distribution mapping defining comprises performing HashMap partitioning of the data table.

15. The product of claim 14, wherein the HashMap partitioning comprises a combination of hash and list partitioning.

16. A computer program product including a computer useable medium with computer readable code embodied on the computer useable medium, the computer readable code comprising:
  computer readable program code devices configured to cause a computer to add a node to a data storage cluster, wherein the data storage cluster stores a table of data in a horizontally partitioned manner over a number of nodes according to a first distribution mapping;
  computer readable program code devices configured to cause the computer to create a second distribution mapping defining partitioning of the table of data including an additional partition in the added node;
  computer readable program code devices configured to cause the computer to copy one or more rows associated with the table of data from the number of nodes to the added node, the copied rows being defined by the second distribution mapping and the copying excluding copying between the number of nodes, whereby data is retained on the number of nodes; and
  computer readable program code devices configured to cause the computer to delete the copied rows from the number of nodes after switching distribution to the second distribution mapping and waiting for scans to the number of nodes based on the first distribution mapping to complete.

17. A computer program product including a computer useable medium with computer readable code embodied on the computer useable medium, the computer readable code comprising:
  computer readable program code devices configured to cause a computer to add a node to a data storage cluster, wherein the data storage cluster stores a table of data in a horizontally partitioned manner over a number of nodes according to a first distribution mapping;
  computer readable program code devices configured to cause the computer to create a second distribution mapping defining partitioning of the table of data including an additional partition in the added node;

computer readable program code devices configured to cause the computer to copy one or more rows associated with the table of data from the number of nodes to the added node, the copied rows being defined by the second distribution mapping and the copying excluding copying between the number of nodes, whereby data is retained on the number of nodes; and computer readable program code devices configured to cause the computer to create reorganization triggers transferring data manipulation language (dml) from partitions based on the first distribution mapping to partitions based on the second distribution mapping and, after the copying, commit to transactions to the table of data stored in the data storage cluster.

* * * * *